United States Patent
Tanaka et al.

(10) Patent No.: US 7,308,348 B2
(45) Date of Patent: Dec. 11, 2007

(54) METHOD OF CONTROLLING SEATBELT RETRACTOR

(75) Inventors: Koji Tanaka, Moriyama (JP); Koji Inuzuka, Echi-gun (JP)

(73) Assignee: Takata Corporation, Tokyo (JP)

(*) Notice: Subject to any disclaimer, the term of this patent is extended or adjusted under 35 U.S.C. 154(b) by 192 days.

(21) Appl. No.: 11/032,047

(22) Filed: Jan. 11, 2005

(65) Prior Publication Data

US 2005/0154517 A1    Jul. 14, 2005

(30) Foreign Application Priority Data

Jan. 14, 2004    (JP)    ............................. 2004-006424

(51) Int. Cl.
*G05D 1/00* (2006.01)
*B60R 22/04* (2006.01)

(52) U.S. Cl. .................. 701/45; 280/802; 180/268

(58) Field of Classification Search ............ 701/45–47; 180/268–270; 280/801.1, 802–807

See application file for complete search history.

(56) References Cited

U.S. PATENT DOCUMENTS

| | | | |
|---|---|---|---|
| 4,580,812 A | | 4/1986 | Yoshitsugu et al. |
| 4,763,750 A | * | 8/1988 | Yoshitsugu .................. 180/268 |
| 4,896,742 A | | 1/1990 | Shitanoki et al. |
| 6,374,938 B2 | | 4/2002 | Yano et al. |
| 6,485,057 B1 | | 11/2002 | Midorikawa et al. |
| 6,494,395 B1 | | 12/2002 | Fujii et al. |
| 6,702,056 B2 | * | 3/2004 | Tanaka et al. ............... 180/269 |

* cited by examiner

*Primary Examiner*—Yonel Beaulieu
(74) *Attorney, Agent, or Firm*—Manabu Kanesaka

(57) ABSTRACT

A method of controlling a seatbelt retractor having a mechanism for retracting a seatbelt with a motor includes the steps of receiving a door-open signal; determining whether the door-open signal is received after a predetermined time since a door-lock release signal is input; and retracting the seatbelt only when the door-open signal is received after the predetermined time since the door-lock release signal is input.

4 Claims, 2 Drawing Sheets

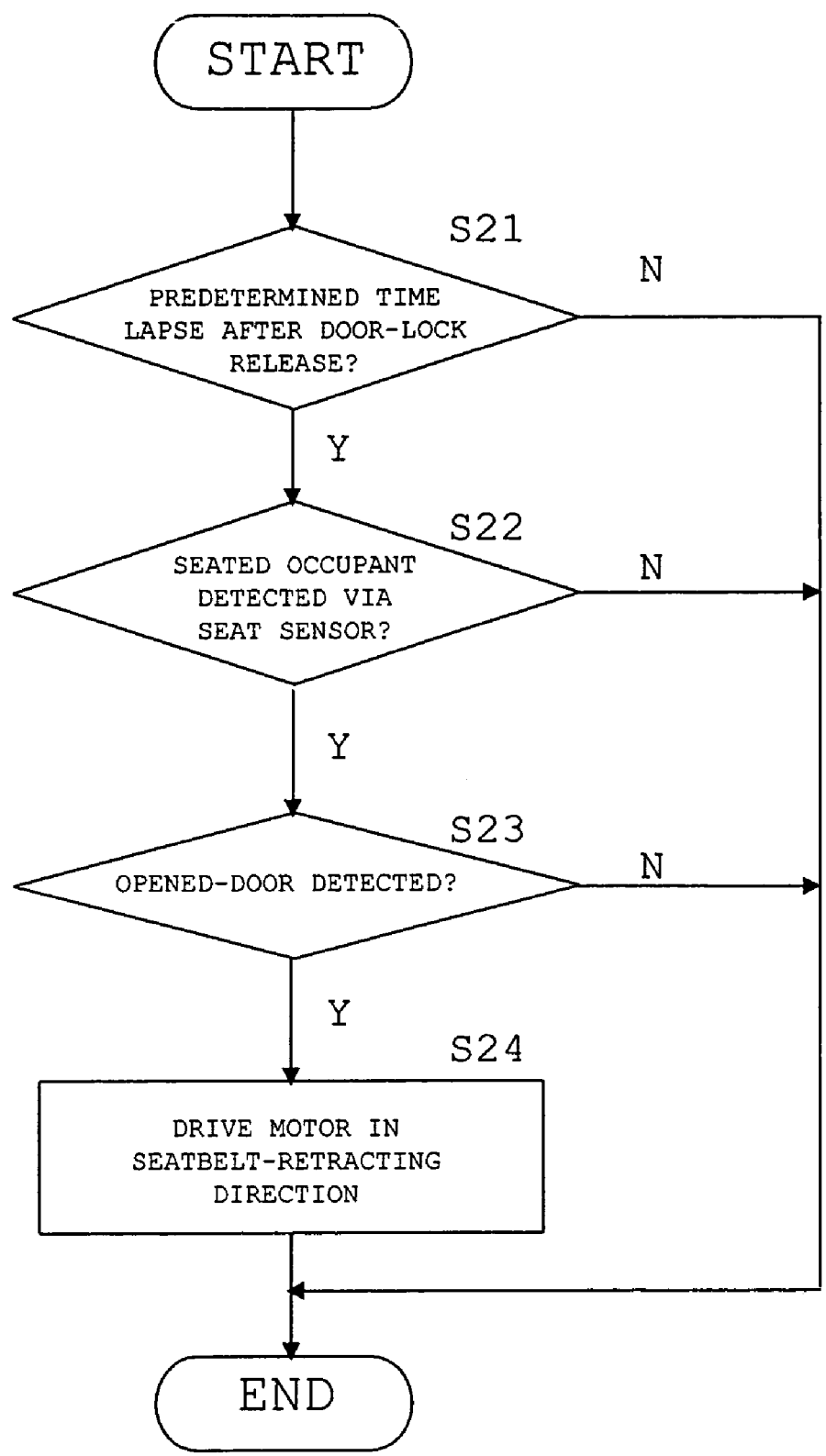

METHOD OF CONTROLLING SEATBELT RETRACTOR

BACKGROUND OF THE INVENTION AND RELATED ART STATEMENT

The present invention relates to a method of controlling a seatbelt retractor having a mechanism for retracting a seatbelt with a motor.

A typical seatbelt retractor provided in a vehicle has a function of retracting an excessively withdrawn portion of a seatbelt when a seated occupant pulls out the seatbelt and fastens a tongue to a buckle. To achieve such a function, a conventional seatbelt retractor is provided with a single return spring. When a seatbelt is fastened, a person pulls out the seatbelt against a resilient force of the return spring. When the person attaches a tongue to a buckle and releases the seatbelt, the seatbelt retractor retracts an excess portion of the seatbelt with the return spring until the seatbelt fits the occupant.

As described above, in such a seatbelt retractor, it is necessary to properly retract an excess portion of the seatbelt until the seatbelt fits the occupant. When a seatbelt is not used, it is necessary to securely retract the seatbelt until the seatbelt is properly stored in a housing. When a seatbelt is properly worn by the occupant, the seatbelt must not provide an unnecessary pressure to the occupant, for example, a chest of the occupant.

In the seatbelt retractor with the single return spring, when the spring has a low resilient force to reduce the pressure on the chest of the occupant wearing the seatbelt, the force for retracting (for storing) the seatbelt is also reduced, thereby making it difficult to operate and retract the seatbelt smoothly. In contrast, when the spring has a high resilient force to obtain a sufficient force for retracting the seatbelt, the pressure on the chest of the occupant wearing the seatbelt is increased.

Further, in the conventional seatbelt retractor with the single return spring, the return spring is wound as the seatbelt is withdrawn further, thereby increasing the resilient force of the spring. Accordingly, the retracting force increases as the withdrawn length of the seatbelt increases.

To solve such problems, Japanese Patent Publication (Kokai) No. 2001-225720 has disclosed a method of retracting a seatbelt with a seatbelt retractor having a motor or a combination of a motor and a return spring. Such a seatbelt retractor provided with a mechanism for retracting a seatbelt with a motor has been also disclosed in Japanese Patent Publications (Kokai) No. 11-301407 and No. 11-334533.

In the seatbelt retractors provided with the mechanism for retracting a seatbelt with a motor, the seatbelt is generally retracted when the seatbelt is released from a buckle. Further, it is convenient that the seatbelt is retracted when the occupant gets out of a vehicle. For this end, it is preferable to provide a door switch or the like so that when a signal indicating that a door is opened is received, a seatbelt is retracted.

In general, a door is opened not only when an occupant tries to get out of a vehicle, but also when an occupant tries to enter a vehicle. When an occupant enters a vehicle, a seatbelt is already in a completely retracted state. Accordingly, it is a waste of energy, i.e. battery power, for driving a motor to retract a seatbelt in such a case.

In view of the problems described above, an object of the present invention is to provide a method of controlling a seatbelt retractor to retract a seatbelt only when an occupant tries to get out of a vehicle, thereby providing smooth seatbelt retraction for the occupant and preventing waste of battery power.

Further objects and advantages of the invention will be apparent from the following description of the invention.

SUMMARY OF THE INVENTION

In order to attain the objects described above, according to a first aspect of the present invention, a method of controlling a seatbelt retractor having a mechanism for retracting a seatbelt with a motor includes the steps of receiving a door-open signal; determining whether the door-open signal is received after a predetermined time from when a door-lock release signal is input; and retracting the seatbelt only when the door-open signal is received after the predetermined time from when the door-lock release signal is input.

In the first aspect of the present invention, it is determined whether the door-open signal is input after the predetermined time from when the door-lock release signal is input. Based on the determination, the seatbelt is retracted only when the door-open signal is input after the predetermined time from when the door-lock release signal is input.

When a person tries to get into a vehicle, a door is generally open within a certain time after the door-lock release signal is input. In contrast, when an occupant tries to get out of a vehicle, it generally takes a longer time after the door-lock release signal is input. Consequently, even if the door-open signal is input, the seatbelt is not retracted until the predetermined time lapses after the door-lock release signal is input, thereby preventing the seatbelt from being retracted when a person opens the door to get into the vehicle.

The predetermined time lapse may be determined by calculating an average time period between the input of the door-lock release signal and the opening of the door, and adding a certain value to the average value.

In the first aspect of the present invention, the seatbelt is retracted only when the door-open signal is received. It should be noted that the seatbelt is still retracted on other occasions such as when a buckle is released or engaged.

According to a second aspect of the present invention, a method of controlling a seatbelt retractor having a mechanism for retracting a seatbelt with a motor includes the steps of receiving a door-open signal; determining whether the door-open signal is received after a predetermined time from when a door-lock release signal is input, and whether a seat sensor determines that an occupant is seated; and retracting the seatbelt only when both of the conditions are met.

In the first aspect of the present invention, it is determined whether the door-open signal is received after the predetermined time from when the door-lock release signal is input. In the second aspect of the invention, in addition to the first aspect, it is determined whether the seat sensor determines that an occupant is seated. Only when both of the conditions are met, the seatbelt is retracted, thereby preventing the seatbelt from being retracted when a person opens the door to get into the vehicle.

According to a third aspect of the present invention, in the method of one of the first and second aspects, the door-lock release signal is preferably sent from the key of the keyless entry system. In the first or second aspect, it is possible to make the method more effective when the door-lock release signal is sent from the key of the keyless entry system.

As described above, the present invention provides a method of controlling a seatbelt retractor to retract a seatbelt only when an occupant tries to get out of a vehicle, thereby providing a smooth seatbelt retraction for the occupant and preventing waste of battery power.

BRIEF DESCRIPTION OF THE DRAWINGS

FIG. 2 is a flow chart showing a method of controlling a seatbelt retractor according to a second embodiment of the present invention.

DETAILED DESCRIPTION OF PREFERRED EMBODIMENTS

Figure 1:
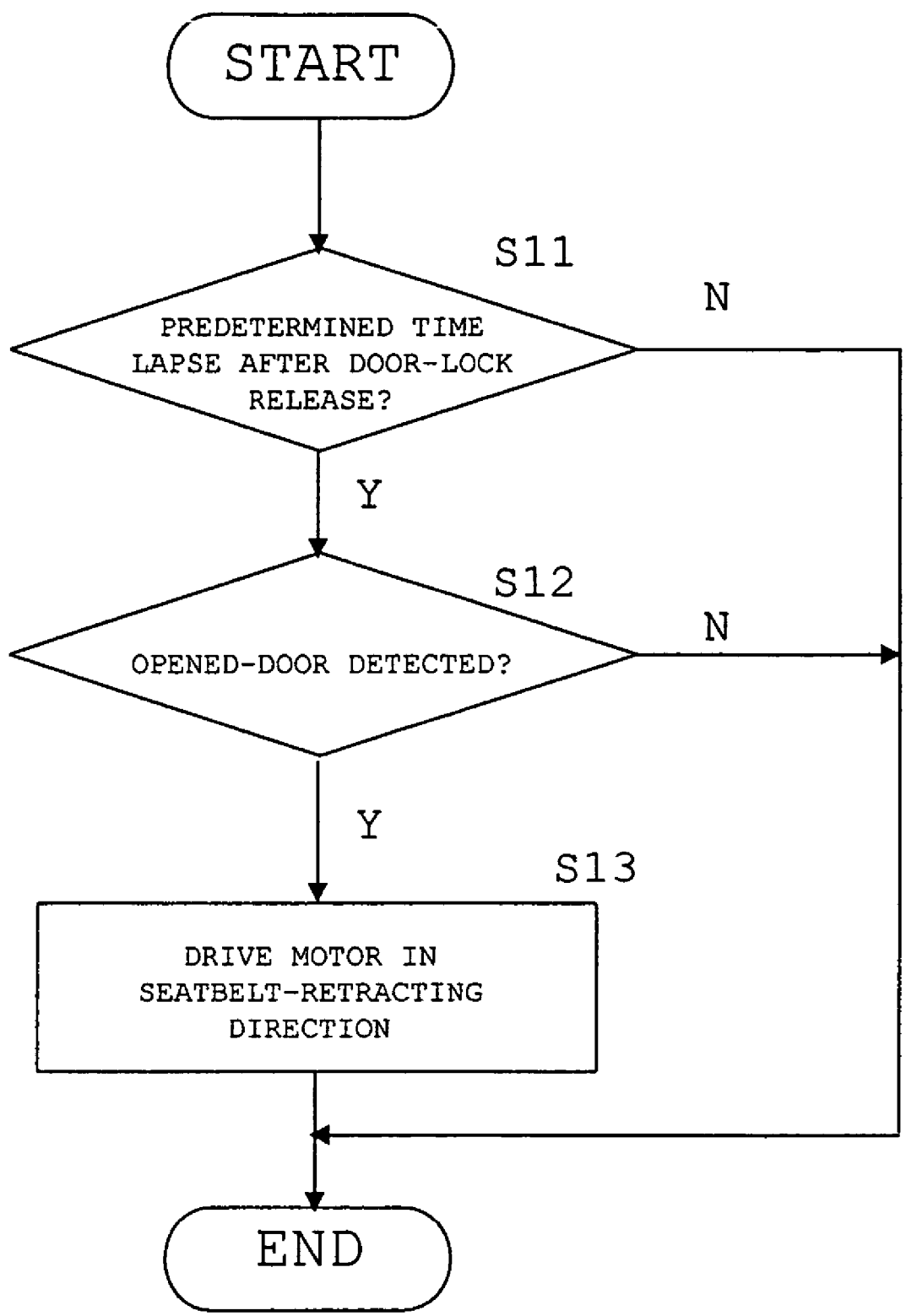
FIG. 1 is a flow chart showing a method of controlling a seatbelt retractor according to a first embodiment of the present invention.

Hereunder, embodiments of the present invention will be described with reference to the accompanying drawings. FIG. 1 is a flow chart showing a method of controlling a seatbelt retractor according to a first embodiment of the present invention. In addition to a mode (condition) shown in the drawings, there are generally several seatbelt retraction modes such as when a buckle is engaged. The following description will include only a mode related to the present invention.

A procedure shown in FIG. 1 is repeated at a predetermined interval except during the seatbelt is being retracted. In step S11, it is determined whether a predetermined time lapses since a door-lock release signal from a keyless entry system is input. When the predetermined time does not lapse, the operation stops. Accordingly, after the door-lock release signal is input, even if a door is opened, it is determined that the door is opened for a person to get into a vehicle until the predetermined time lapses.

After the predetermined time lapses, in step S12, it is determined whether the door is open through checking, for example, a door switch. When it is determined that the door is not opened, the operation stops. When the door is detected to be open, it is determined that a vehicle occupant gets out of the vehicle. In this case, in step S13, a motor is driven in a direction for retracting the seatbelt. The operation does not proceed from step S11 to step S13 when a person enters the vehicle, so that the seatbelt is retracted only when an occupant gets out of the vehicle.

FIG. 2 is a flow chart showing a method of controlling a seatbelt retractor according to a second embodiment of the present invention. The second embodiment is basically the same as the first embodiment except additional steps S22 and S23. Similar to the first embodiment, the procedure is repeated at a predetermined interval except during the seatbelt is being retracted.

In step S21, it is determined whether a predetermined time lapses since a door-lock release signal from a keyless entry system is input. When the predetermined time does not lapse, the operation stops. When the predetermined time lapses, in step S22, it is determined whether a vehicle occupant is seated with a seat sensor through checking, for example, whether a seat load-cell detects a weight greater than a threshold value. When it is determined that a vehicle occupant is not seated, the operation stops.

When it is determined that a vehicle occupant is seated, in step S23, it is determined whether a door is opened through checking, for example, a door switch. When it is determined that the door is not opened, the operation stops. When the door is detected to be open, it is determined that a vehicle occupant gets out of the vehicle, and a motor is driven in a direction for retracting the seatbelt in step S24.

With the procedure described above, it is possible to properly perform the seatbelt retraction mode only when the vehicle occupant opens the door to get out of the vehicle.

The disclosure of Japanese Patent Application No. 2004-006424, filed on Jan. 14, 2004, is incorporated in the application.

While the invention has been explained with reference to the specific embodiments of the invention, the explanation is illustrative and the invention is limited only by the appended claims.

What is claimed is:

1. A method of controlling a seatbelt retractor to retract a seatbelt with a motor, comprising:

receiving a door-lock release signal of a vehicle when a door-lock is released, receiving a door-open signal of the vehicle when a door is opened, determining whether the door-open signal is received after a predetermined time since the door-lock release signal is received to thereby judge if an occupant gets out of the vehicle, and retracting the seatbelt with the motor only when the door-open signal is received after the predetermined time since the door-lock release signal is received so that the seat belt is retracted on the retractor only when the occupant gets out of the vehicle.

2. A method of controlling a seatbelt retractor according to claim 1, further comprising determining whether the occupant is seated with a seat sensor, wherein said seatbelt is retracted only when the door-open signal is received after the predetermined time since the door-lock release signal is received, and it is determined that the occupant is seated.

3. A method of controlling a seatbelt retractor according to claim 1, wherein said door-lock release signal is sent from a key of a keyless entry system.

4. A method of controlling a seat belt retractor according to claim 1, wherein said predetermined time is an average time period between an input of the door-lock release signal and opening of the door with a certain value.

* * * * *